3,095,418
3-[2-(5 - ACETOXY - 2 - HYDROXY-3,5-DIMETHYL-CYCLOHEXYL) - 2 - HYDROXYETHYL]GLUTARIMIDE AND DERIVATIVES THEREOF
Koppaka V. Rao, Pine Brook, N.Y., assignor to Chas. Pfizer & Co., Inc., New York, N.Y., a corporation of Delaware
Filed May 25, 1960, Ser. No. 31,623
5 Claims. (Cl. 260—281)

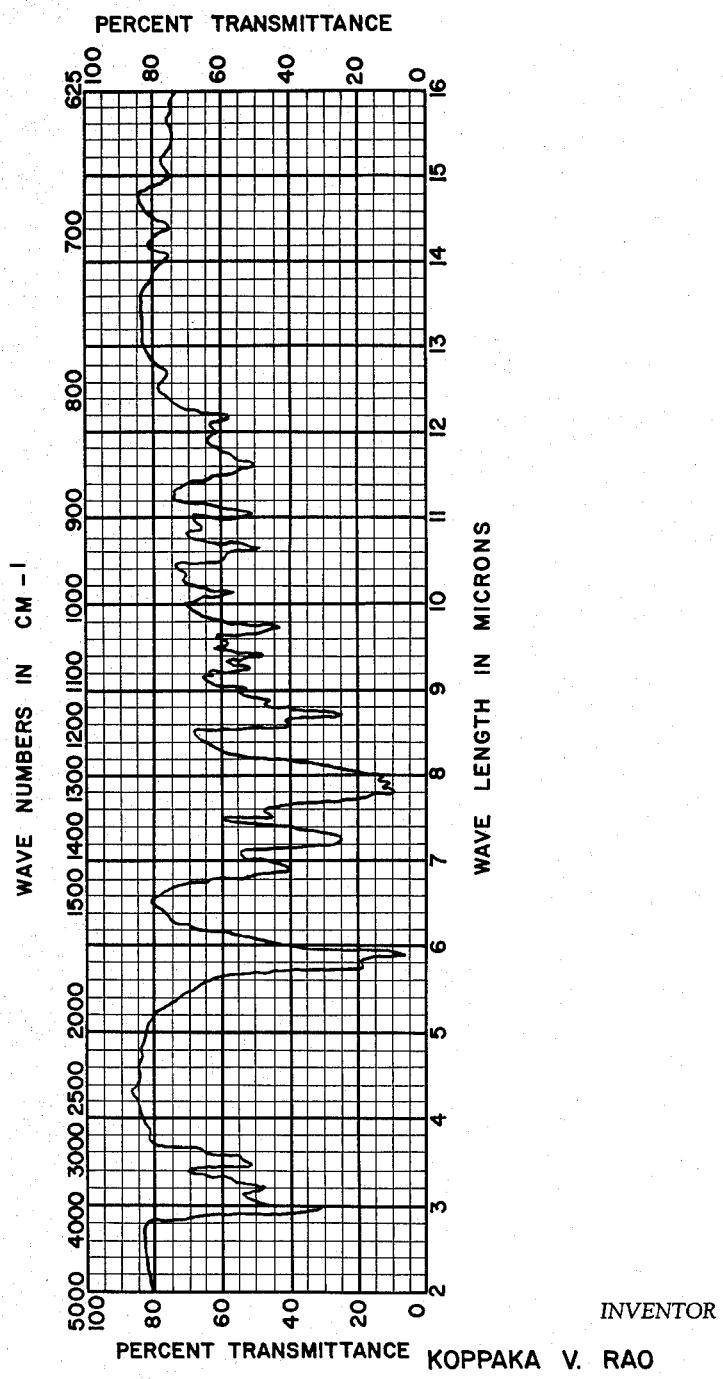

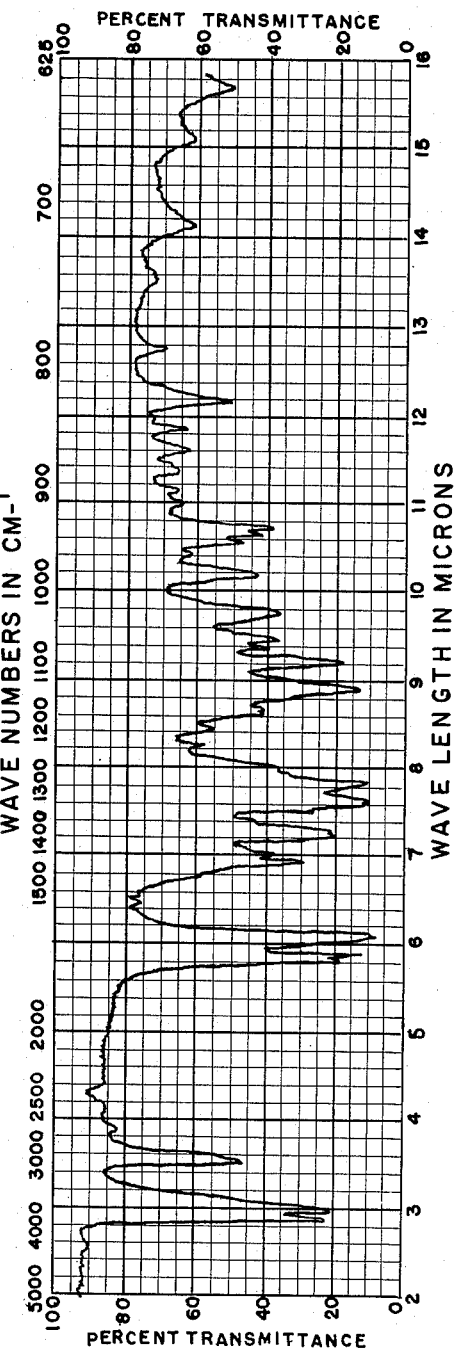
FIG. II
INFRARED ABSORPTION SPECTRUM OF 3-[2-(5-ACETOXY-2-HYDROXY-3,5-DIMETHYLCYCLOHEXYL)-2-HYDROXYETHYL] N-METHYL GLUTARIMIDE
INVENTOR
KOPPAKA V. RAO
BY Connolly and Hutz
ATTORNEYS United States Patent Office 3,095,418
Patented June 25, 1963

This invention is concerned with new and useful compounds having antitumor activity against freshly implanted and established tumors and relatively low toxicity. They are also useful as intermediates for the preparation of other biologically active substances hereinafter described.

This application is a continuation-in-part of the copending applications Serial Nos. 682,548, filed September 6, 1957, and 813,695, filed May 18, 1959, both applications having since been abandoned. In applications Serial Nos. 651,092 filed April 5, 1957, and now abandoned, and 753,594, filed August 4, 1958, the preparation of compound E-73, 3-[2-(5-acetoxy-3,5-dimethyl-2-oxocyclohexyl)-2-hydroxyethyl]glutarimide, a novel and useful product elaborated by a new species of streptomyces, designated *Streptomyces albulus* ATCC 12757, and derivatives thereof, is described. The two applications, of which the present application is a continuation-in-part, describe the preparation of dihydro E-73, a new and biologically active compound, and derivatives thereof.

The present invention relates to various biologically active derivatives obtainable by a variety of chemical transformations on compound E-73. The present application is concerned with the dihydro derivative of compound E-73 which is prepared by the reduction of compound E-73, the ketone group of E-73 being converted to a secondary alcohol group as in Formula A:

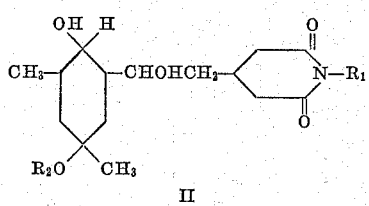

II

| Formula | R₁ | R₂ |
|---|---|---|
| A | H | CH₃CO |
| B | CH₃ | CH₃CO |
| C | H | H |
| D | CH₃ | H | the N-methyl dihydro derivative thereof (Formula B) which is prepared by methylation of the imide nitrogen of the dihydro compound, the desacetyl derivatives of these two novel and useful compounds (Formulae C and D) which are prepared by mild acid hydrolysis of compounds A and B, and with esters of the compounds of Formulae A to D.

This new substance of Formula II has been designated dihydro E-73. Its systematic name is 3-[2-(5-acetoxy-2-hydroxy-3,5-dimethylcyclohexyl)-2-hydroxyethyl] - glutarimide. It is a water soluble colorless crystalline substance; M.P. 140–141° C. Its N-methyl derivative, a colorless crystalline substance melting at 117–119° C., is named 3-[2-(5-acetoxy-2-hydroxy-3,5-dimethylcyclohexyl)-2-hydroxyethyl]-N-methylglutarimide.

The products of this invention are useful as intermediates for the preparation of a variety of further substances, some of which are useful antitumor agents, and others which have different types of biological activity or use in characterizing and purifying dihydro E-73. Thus, dihydro E-73 reacts with ketones and aldehydes to give a cyclic substituted methylidene derivative in which the exocyclic hydroxyl group and the hydroxyl group in the cyclohexane ring are bridged through a substituted methylene group, that is, a 1,3-dioxane derivative. Treatment of these products with various carboxylic type acylating agents provides esters thereof. Useful acylating agents include hydrocarbon carboxylic acid and polycarboxylic acid anhydrides, mixed anhydrides, and halides of these acids having from 2 to about 18 carbon atoms. For instance, a diacetate M.P. 177° C. is formed by treatment of dihydro E-73 with acetic anhydride. Benzoates and palmitates are obtained by treatment with the acid chlorides in pyridine. Maleates and phthalates are obtained by treatment with maleic or phthalic anhydrides.

Hydrolysis of dihydro E-73 and N-methyldihydro E-73 with dilute aqueous acid results in removal of the 5-acetoxyl group to provide the corresponding alcohol, viz. desacetyl and desacetyl N-methyl dihydro-73.

Treatment of desacetyl dihydro E-73 and its N-methyl homolog with the common acylating agents such as the carboxylic acid halides, anhydrides and mixed anhydrides yields mono, di, or triesters. In the specific instance where acetic anhydride is employed, monoacetates identical with the compounds dihydro E-73 hereinbefore described and N-methyldihydro E-73 herein described can be obtained. Isomeric monoacetates are also obtainable. Other useful esters having antitumor and antiprotozoal activity are obtained, however, from desacetyl dihydro E-73 as an intermediate which are not obtainable from dihydro E-73 itself. Thus, acylation of dihydro E-73 itself, for instance with palmitoyl chloride, yields a compound having the acetate group originally present in dihydro E-73 and the palmitate group or groups introduced by the esterification. On the other hand, treatment of desacetyl dihydro E-73 with palmitoyl chloride yields a mixture of dipalmitates or a tripalmitate none of which is obtainable directly from dihydro E-73. In like manner, the esters of the remaining compounds of this invention are obtained. These diesters and triesters have uses similar to those of the esters of dihydro E-73, and they have increased solubility in the organic solvents. Hydrolysis of dihydro E-73 with dilute aqueous alkali yields a nitrogen-free compound which results from the opening of the glutarimide ring with the loss of ammonia, cleavage of the O-acetyl group and, on acidification, lactonization.

The lactone on treatment with diazomethane provides a methyl ester which on ammonolysis provides a glutaric diamide derivative. When dihydro E-73 or desacetyldihydro E-73 are treated with a methylating agent, such as dimethylsulfate or diazomethane, the N-methyl homologs result. These transformations are illustrated in the following chart. The Roman numerals used to designate the various structural formulas correspond to the number of the example describing the preparation of that substance appearing hereinafter. The reactions illustrated are, of course, also applicable to the other products of this invention.

Monoesters of dihydro E-73 are prepared by the reduction of the corresponding E-73 esters. For instance, reduction of E-73 acetate which is described and claimed in application Serial No. 753,594 yields the monoacetate of dihydro E-73, more precisely 3-[2-(5-acetoxy-2-hydroxy - 3,5 - dimethylcyclohexyl) - 2 - acetoxyethyl] - glutarimide. The higher monoesters are prepared in analogous fashion. For instance, from the palmitate, phthalate, butyrate, or undecylenate of E-73 the corresponding monopalmitate, monophthalate, monobutyrate, or monoundecylenate of dihydro E-73 is obtained.

In summary, the esters of dihydro E-73 have the following formulas:

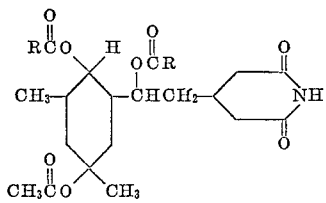

Formula E

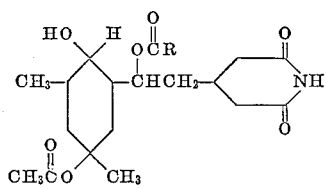

Formula F wherein RCOO contains from 2 to about 18 carbon atoms and represents the residue remaining after the esterification of a hydrocarbon monocarboxylic acid or one carboxyl group of a hydrocarbon polycarboxylic acid.

Dihydro E-73 has been found to possess substantial antiprotozoal and tumor inhibitory activity. Although dihydro E-73 is somewhat less active as an antitumor agent than compound E-73, it possesses the advantage of being approximately twenty fold less toxic than E-73 and more readily administered. The $LD_{50}$ for mice of dihydro E-73 is 10 mg./kg. when intraperitoneal injections of the material are administered on each of six consecutive days. Thus, dihydro E-73 due to its lower toxicity is safer and easier to administer than E-73.

Dihydro E-73 has proven to have substantial activity via oral and parenteral administration against various tumors in animals including sarcoma 180 of mice, the human sarcoma HS No. 1 when transplanted into rats, and various spontaneous lymphomas of dogs.

Dihydro E-73 has demonstrated substantial activity against the protozoan Endamoeba histolytica, the etiological agent of amebic dysentery. In vivo activity against this species has been proven in experimental animals on both therapeutic (post infection treatment) and prophylactic regimens. It is comparable in effectiveness to the drug emetine.

N-methyldihydro E-73 demonstrates substantially the same tumor inhibitory activity, although at higher dosage rates, as does dihydro E-73 and is active via both oral and parenteral administration. However, it possesses the advantage of causing approximately one-twentieth the emetic reaction of dihydro E-73 and is especially valuable for this reason. It exhibits significant activity against adenocarcinoma 755 in mice and is somewhat less active against Sarcoma 180 in mice and human Sarcoma HS No. 1 transplanted into rats.

Although it is quite satisfactory to administer the compounds of this invention parenterally either as an aqueous solution or suspension or dissolved or suspended in physiological saline, various types of pharmaceutical preparations can be advantageously compounded which contain the desired compound along with both liquid and solid diluents. They can also be administered orally but the parenteral routes are generally preferred. Solid preparations for extemporaneous dilution can be prepared containing various buffering agents as well as local anesthetics, and other medicinal agents such as antibiotics, antibacterial agents, hypnotics, analgesics, etc., and inorganic salts to afford desirable pharmacological properties to the composition.

Doses of the order of 0.5 to 7 mg./kg. of dihydro E-73 and of 5 to 125 mg./kg. of N-methyl dihydro E-73 are highly effective in inhibiting tumors and combating amoebic infections in animals. They are preferably administered parenterally in the form of dilute solutions or suspensions. Various pharmacologically acceptable solvents may be employed for this purpose including water, propylene glycol, diethyl carbonate, glycerol, etc., since the substances are stable and compatible with all such media. They may be also administered as suspensions in such vehicles as peanut oil or sesame oil.

A variety of means are available for preparing dihydro E-73 by reducing E-73 and for preparing the monoesters of dihydro E-73 including both chemical and catalytic processes. Various catalysts known to be effective for the hydrogenation of ketones to alcohols such as palladium, rhodium, copper-chromium oxide, and Raney nickel catalysts, may be employed for the hydrogenation of E-73. With regard to chemical methods, it must be remembered that E-73 is sensitive to hydrolysis due to the presence of the imide function as well as the acetoxyl group. Therefore, conditions must be selected which will not affect these other functions. Suitable chemical reducing agents include the metal hydrides such as sodium borohydride and lithium aluminum hydride, aluminum isopropoxide, aluminum amalgam and alcohol, etc. Electrolytic reduction may also be employed.

A preferred process for the preparation of dihydro E-73 involves the use of the Adams platinum oxide catalyst. The reaction is carried out in the classical fashion at atmospheric pressure or slightly above, say up to about five atmospheres. A variety of solvents can be employed including water, the lower alkanols such as methanol, ethanol, propanol and butanol, the lower aliphatic alkanoates such as methyl acetate, ethyl acetate, propyl formate, and methyl butyrate, and indeed any solvent in which E-73 is soluble and which is compatible with the catalyst, that is, a solvent which itself is not hydrogenated under the conditions employed and which does not poison the catalyst. Glacial acetic acid has been found to provide satisfactory results.

The process is carried out by pre-reducing the platinum oxide catalyst, adding the appropriate quantity of E-73 or ester thereof dissolved in glacial acetic acid, approximately 1 g. per 10 cc. of solvent, and contacting with hydrogen by agitation of the suspension of catalyst in the solution under a slight head of hydrogen pressure. When absorption ceases, usually after the reaction of one mole of hydrogen, the catalyst is filtered and the filtrate concentrated to dryness. The residue is then crystallized by treatment with various non-polar solvents such as ether and recrystallized from an appropriate solvent or solvent mixture. A mixture of methylene chloride and ether has been found to be highly satisfactory.

N-methyldihydro E-73 is prepared by the methylation of dihydro E-73 by means of diazomethane in ethanol-ether solution or of dimethylsulfate in refluxing acetone in the presence of potassium carbonate.

Dihydro E-73 is approximately ten times as active an antitumor agent as the known antibiotic, cycloheximide. The ability of cycloheximide to inhibit sarcoma 180 in mice has been reported by Reilly et al. in Cancer Research 13, 684 (1953). Their conclusion was that cycloheximide has a slight effect on this type of tumor. The tumors were reduced in size on an average of up to about ½ that of tumors in untreated control mice at very high dosages, 50 mg./kg. per day. When this dosage was doubled to enhance that inhibition, 80% of the animals died.

A similar test with dihydro E-73 was made employing Swiss mice weighing 18 to 22 g., all of the same sex, and a line of sarcoma 180 originating at the Southern Research Institute, Birmingham, Alabama. Tumor fragments from 1 to 2 mm. in diameter were cut from nonnecrotic portions of the donor tumor and implanted in the axillary region of each test mouse. Injections of the drug were begun twenty-four hours after tumor implantation and continued twice daily for seven days at a dosage of 5 mg./kg. The animals were weighed on the first, fourth and eighth days to provide a measure of the toxic effect of the drug. Twenty-four hours after the last injection, the animals were sacrificed and the tumors excised and weighed. Although some toxic reactions were observed with the death of a few mice, the survivors benefited from a 75% inhibition of the tumor.

N-methyldihydro E-73 when evaluated in this manner demonstrated substantial inhibitions in tumor growth.

TABLE I.—ACTIVITY OF N-METHYL DIHYDRO E-73 VERSUS SARCOMA 180 IN MICE

| Dose, mg./kg. | Survival Rate | Percent Inhibition |
| --- | --- | --- |
| 15 | 6/6 | 43 |
| 20 | 6/6 | 34 |
| 25 | 6/6 | 62 |
| 25 | 4/6 | 69 |

The antitumor activity of N-methyldihydro E-73 and dihydro E-73 versus mammary adenocarcinoma 755 (CA-755) in mice, evaluated according to the procedure of Gellhorn et al., Cancer Research, Supplement III, p. 38, 1955, are given below in Tables II-A and B, respectively.

TABLE II-A.—ACTIVITY OF N-METHYL DIHYDRO E-73 VERSUS CA-755 IN MICE

| Dose, mg./kg. | Survival Rate | Percent Inhibition | Remarks |
| --- | --- | --- | --- |
| 6 | 10/10 | 79 | Injections from 1st day after implantation. |
| 7.5 | 10/10 | 73 | Do. |
| 10 | 10/10 | 77 | Do. |
| 10 | 9/10 | 82 | Do. |
| 10 | 10/10 | 86 | Do. |
| 15 | 9/10 | 90 | Do. |
| 20 | 9/10 | 94 | Do. |
| 20 | 8/10 | 97 | Do. |
| 12 | 10/10 | 64 | Injections from 6th day after implantation. |
| 15 | 9/10 | 92 | Do. |
| 20 | 10/10 | 81 | Do. |
| 20 | 8/10 | 97 | Do. |
| 25 | 8/10 | 97 | Do. |
| 30 | 9/10 | 86 | Do. |
| 40 | 7/10 | 86 | Do. |
| 40 | 6/10 | 82 | Do. |
| 50 | 6/10 | 90 | Do. |
| 75 | 10/10 | 57 | Injections on 1st day and 6th day after implantation. |
| 125 | 8/10 | 66 | Do. |
| 5 | 9/10 | 76 | Oral treatment. |
| 10 | 6/10 | 96 | Do. |

TABLE II-B.—ACTIVITY OF DIHYDRO E-73 VERSUS CA-755 IN MICE

| Dose, mg./kg. | Survival Rate | Percent Inhibition | Remarks |
| --- | --- | --- | --- |
| 2 | 10/10 | 87 | Oral—from 1st day. |
| 2.5 | 10/10 | 84 | Injections from 2nd day after implantation. |
| 4 | 10/10 | 70 | Injections from 6th day after implantation. |
| 8 | 9/10 | 83 | Do. |
| 12 | 9/10 | 89 | Do. |
| 30 | 10/10 | 68 | Injections given on the 2nd an 6th day after implantation. |

Dihydro E-73 was also evaluated for its activity against a human tumor in a heterologous host. The human sarcoma HS No. 1 which had been cultivated in rats by Chen's technique (Cancer Research 14, 660 (1954)) was used. Rats bearing sample tumors were obtained, and the tumors removed and sterilized by washing with a solution containing penicillin and dihydrostreptomycin. The tumors were then minced and suspended in buffered glucose ringer solution at a concentration of 80% tumor tissue. Rats which had previously been exposed to 150 R of X-radiation and treated with cortisone acetate were then injected subcutaneously in the flank with 1 ml. of the above tumor suspension. The animals implanted with the suspension of HS No. 1 received their first drug treatment by intraperitoneal injection on the second day after implantation and daily doses thereafter until twenty-four hours prior to sacrifice on the thirteenth day. In every case, control groups of rats were maintained. Tumors of reproducible size within the usual biological limits were obtained in the control animals. At the time of sacrifice, the tumors were exercised and divested of connective tissue and weighed. Of eight test animals treated with 2.5 mg./kg. of dihydro E-73, seven survived the treatment period, and were observed to have benefitted from a 65% reduction in the size of the tumors.

Evaluation of N-methyldihydro E-73 in the same manner at dosage rates ranging from 5 to 60 mg./kg. produced reductions in the size of the tumors of from 32% at the lower dosage level to 65% at the higher dosage level of two groups of eight animals treated with 5 and 10 mg./kg. respectively, all survived. Of three groups of six animals treated with 20, 40 and 60 mg./kg. respectively, all survived the treatment period.

N-methyldihydro E-73 is of greater activity against lymphoid leukemia (L-1210) than dihydro E-73 as determined by the procedure of Law, Journal Nat. Cancer Inst. 10, 179 (1949). The test animals were observed to survive for considerably longer periods of time than the control animals (Table III).

TABLE III.—ANTITUMOR ACTIVITY OF N-METHYL DIHYDRO E-73 VERSUS L-1210

| Dosage, mg/kg.: | Percent increase in life span compared to controls |
| --- | --- |
| 10 | 133 |
| 15 | 143 |
| 25 | 131 |

Having now described the nature of the present invention and the manner in which it is to be practiced, the following specific examples are provided to illustrate in detail methods of making use thereof. It is, however, not to be considered as limiting the scope of the invention in any fashion. The scope is set forth in the appended claims.

Example I

Approximately 10 liters of a fermentation broth having the following composition was prepared and the batch adjusted to pH 7.

| | g./l. |
|---|---|
| Glucose | 10 |
| Soybean meal | 15 |
| Dipotassium phosphate | 5 |
| Sodium chloride | 2 |
| Distillers' solubles | 2.5 |
| Calcium carbonate | 2 |

The broth was then distributed to a number of 1 l. Erlenmeyer flasks each containing approximately 225 ml. of the medium, and the flasks with contents sterilized by autoclaving for 20 minutes at 15 lbs. steam pressure (121° C.). The inoculum was prepared by transferring the growth of a well sporulated slant of *Streptomyces albulus* ATCC 12757 to a flask of the above medium and incubating the same at 28° C. for 36 to 40 hours on a rotary shaker. Two such inoculum flasks were prepared. The remaining flasks containing the sterile broth were then inoculated with about 5% their volume of the inoculum so prepared and incubated by shake culture at 28° C. for 65 hours. The finished beer was then filtered over glass wool and the clear filtrate passed through a sintered glass filter of ultra-fine porosity providing a sterile filtrate. This filtrate was found to possess from about 200 to 300 *Saccharomyces cerevisiae* dilution units of activity per milliliter by the standard plate assay.

Approximately 10 liters of the filtered fermentation broth was extracted at pH 7 with 5 l. of ethyl acetate. The spent broth was found to be almost inactive on both the antitumor HS No. 1 and antiyeast plate assays. The ethyl acetate extract on the other hand contained highly active material for each assay. The solvent extract was evaporated under reduced pressure at a temperature of 30–40° C. to approximately 1/50 of its original volume. The residue was then poured into 5 volumes of high-boiling (B.P. 60–90° C.) petroleum ether. The semi-solid mass which precipitated was collected. Its weight was approximately 50% the weight of the original ethyl acetate concentrate which had been treated with petroleum ether. An additional quantity of solid material was recovered from the supernatant petroleum ether by shaking with 80% aqueous methanol (v./v.). The solvent was removed from the aqueous methanol layer and the concentrate added to the solids originally precipitated.

A 10 in. chromatographic column 3½ in. in diameter was prepared containing 2 to 2.5 kg. of acid washed alumina (Merck). The crude product, 100 g., was then dissolved in from 2 to 3 l. of ethyl acetate and this solution was percolated through the column. The resulting chromatogram was developed by passing fresh solvent (ethyl acetate) through the column followed by a solvent mixture made up of ethyl acetate containing approximately 2% of methanol on a weight basis. Approximately 10–12 l. of ethyl acetate was used for development prior to introduction of the solvent mixture. A total of about 16 l. of solvent was used to develop the chromatogram. The eluate was collected in 500 cc. portions, the solvent evaporated from each portion, and the progress of the development followed by measuring the dry weight and antiyeast assay of each fraction. The residues were then combined into fractions on the basis of their antiyeast assays. Development was continued until all antiyeast active material had been removed.

The first fraction, constituting approximately 10% of the total solids charged to the column, was virtually devoid of antitumor and antiyeast activity. It was discarded. The remainder of the eluate residues were combined, and a pure crystalline sample of compound E–73 prepared therefrom by partition chromatography on silica gel treated with aqueous methanol-saturated isopropyl ether which had been previously shaken with 55% aqueous methanol (vg./v.) in the ratio 1 volume of the aqueous methanol to 5 volumes of isopropyl ether. Approximately 25 ml. of the lower aqueous methanol phase was mixed with the above silica gel slurry until the silica gel was uniformly impregnated. Approximately ⅘ of this slurry was then transferred to a glass column of suitable size. The combined eluate fractions constituting crude E–73, 6 g., was then added to the remainder of the impregnated silica gel slurry which results in its being adsorbed on the silica gel. This was then added to the column and development of the column commenced employing the 55% aqueous methanol-saturated isopropyl ether solvent prepared as described above. Portions of the eluate were collected, the solvent removed, the residues weighed and assayed and fractions assembled from consecutive residues on the basis of their physical and biological properties. Impurities and by-products are removed from the column by development with 2.5 l. of this solvent mixture.

The development of the silica gel chromatogram with additional isopropyl ether-aqueous methanol solvent mixture was then continued until no further yeast-active material was obtained. Two liters of solvent were required. This portion was kept separate from the first 2.5 l. of eluate. Evaporation of the solvent from the second 2 l. fraction left a residue which proved to be highly active on the antitumor assay and consisted of pure compound E–73. This material, although in apparently pure condition, was not crystalline but it could be pulverized to a white powder. A crystalline sample was obtained from this material by treatment of a saturated solution of it in ethanol with four volumes of ether. This procedure resulted in the recovery of 75% of the non-crystalline solid as pure crystalline E–73, M.P. 140–141° C.

*Analysis.*—Calcd. for $C_{17}H_{25}O_6N$: C, 60.16; H, 7.42; N, 4.13. Found: C, 60.15; H, 7.61; N, 4.29. $(\alpha)_D^{25} = 8.8°$ (c., 1.0 in methanol).

Crystalline E–73 is moderately soluble in water, the lower alcohols and ether. It is readily soluble in chloroform, methylene chloride, and acetone. That the substance contains a carbonyl group is evidenced by the formation of derivatives with hydroxylamine and 2,4-dinitrophenylhydrazine. Quantitive determination of carbonyl oxygen by titration of the liberated HCl on reaction with hydroxylamine hydrochloride indicates 0.82 mole per mole of E–73 based on the above molecular weight.

Example II

DIHYDRO E–73

A standard low pressure hydrogenation apparatus is employed involving a reservoir containing a specific quantity of hydrogen and equipped with means for measuring the amount of hydrogen consumed, either a mercury manometer to measure the difference in volume or a sensitive pressure gauge to measure the drop in pressure. In the latter instance, pressures of up to about five atmospheres are employed. Adams platinum oxide catalyst, 1.5 g., is suspended in 20 ml. of glacial acetic acid, and reduced with hydrogen in the apparatus to provide a suspension of finely divided platinum in the usual fashion. After the catalyst has been pre-reduced a solution of compound E–73, 3 g., in 30 ml. of glacial acetic acid, is added. Agitation is commenced and the progress of the reaction followed by the rate of hydrogen absorption. After hydrogen absorption has ceased the catalyst is removed by filtration and the filtrate concentrated to dryness under reduced pressure. The amorphous residue crystallizes when treated with about 50 ml. of ether. The crude crystalline material is then purified by recrystallization from 20 ml. of a 1:5 mixture of methylene chloride and ether. The yield of purified dihydro E-73 is 2.8 g., M.P. 140-141° C. A mixed M.P. with compound E-73, the starting material, is 115-125° C. Purified dihydro E-73 exhibits characteristic absorption in the infrared region of the spectrum at the following wave numbers: 697, 715, 791, 823, 832, 862, 870, 906, 918, 939, 947, 970, 987, 992, 1030, 1048, 1065, 1081, 1116, 1129, 1142, 1152, 1166, 1252, 1266, 1279, 1332, 1364, 1404, 1439, 1453, 1686, 1724, 2801, 2857, 2899, 3155, and 3356 cm.$^{-1}$. The infrared absorption is graphically represented in FIGURE I.

*Analysis.*—Calcd. for $C_{17}H_{27}O_6N$: C, 59.81; H, 7.97; N, 4.10. Found: C, 59.28; H, 7.90; N, 4.31.

Example III

Compound dihydro E-73, 1.0 g., prepared as described in Example II, was dissolved in 15 ml. of 6 N hydrochloric acid and the resulting clear solution allowed to stand at room temperature for 30 to 40 minutes. It was then diluted with 25 ml. of water and extracted with three 50 ml. portions of methylene chloride. Evaporation of the methylene chloride extract in vacuo yielded desacetyldihydro E-73.

Example IV

Dihydro E-73, 0.5 g., in 50 ml. of acetone containing 2 ml. of dimethyl sulfate and 10 g. of anhydrous potassium carbonate was refluxed for 12 hours. The mixture was filtered and the filtrate concentrated nearly to dryness. The residue was shaken with a mixture of 50 ml. of methylene chloride and 50 ml. of water. The methylene chloride layer was separated and concentrated to dryness. The crude product was purified by silica gel partition chromatography employing the solvent system 60% aqueous methanol-isopropyl ether. The product was crystallized from a methylene chloride-ether mixture and recovered as colorelss needles (79-80° C.).

When recrystallized from aqueous acetone, the monohydrate is obtained as long colorless needles which melt at 68° C., then solidify and remelt at 117-119° C.

*Analysis.*—Calcd. for $C_{18}H_{29}O_6N \cdot H_2O$: C, 57.89; H, 8.37; N, 3.75. Found: C, 57.79; H, 8.29; N, 3.96.

The product is sparingly soluble in water, approximately 1 mg./ml., and more soluble in organic solvents. It exhibits characteristic absorption in the infrared region of the spectrum when measured in a potassium bromide pellet (2%) at the following wave numbers: (FIGURE II): 637, 663, 708, 742, 783, 821, 843, 861, 880, 897, 912, 939, 950, 960, 986, 1028, 1050, 1062, 1086, 1120, 1149, 1157, 1185, 1214, 1274, 1299, 1311, 1379, 1389, 1428, 1445, 1645(S), 1653, 1698, 1721, 2890, 3344, and 3484 cm.$^{-1}$. (S=shoulder.)

In like manner, the product of Example III is converted to N-methyl desacetyldihydro E-73.

Example V

The procedure of Example II is repeated substituting E-73 acetate for the compound E-73 to produce dihydro E-73 monoacetate. Similarly the monobenzoate and monostearate esters of dihydro E-73 are prepared by first esterifying E-73 with benzoyl chloride or stearoyl chloride as described in Serial No. 753,594, and then hydrogenating over platinum as described above.

In like manner, the following monoesters of dihydro E-73 are prepared from the appropriate E-73 ester.

| | |
|---|---|
| Monopropionate | Monohexanoate |
| Monobutyrate | Monomaleate |
| Monostearate | Monooleate |
| Monopalmitate | Monotoluate |
| Monobenzoate | Mononaphthoate |
| Monophthalate | Monosuccinate |

Substitution of N-methyldihydro E-73 for dihydro E-73 in this procedure produces the corresponding monoesters of N-methyldihydro E-73.

Example VI

The diacetate of dihydro E-73 is prepared by dissolving 0.5 g. of the monoacetate of Example V in 2 ml. of acetic anhydride and 1 ml. of pyridine and storing at room temperature for twenty-four hours. The liquid portions of the reaction mixture are then evaporated in a current of air and the residue crystallized from a 5:1 combination of ether and methylene chloride, 10 ml., to yield the diacetate, M.P. 177-178° C.

*Analysis.*—Calcd. for $C_{21}H_{31}O_8N$: C, 59.28; H, 7.34; N, 3.29. Found: C, 58.57; H, 7.24; N, 3.55.

The dibenzoate and dipalmitate esters are prepared in analogous fashion by dissolving approximately 0.3 g. of dihydro E-73 in 1 ml. of pyridine and treating with approximately 0.2 g. of benzoyl chloride or palmitoyl chloride. Other diesters within the scope of the present invention are prepared from the corresponding carboxylic acid anhydrides including those of the polycarboxylic acids or acid chlorides. Examples of such esters include the lower aliphatic carboxylates, such as the dipropionate, di(hydroxypropionate), dibutyrate, divalerate, dihexanoate, diacrylate, dimaleate, the higher aliphatic carboxylates such as the distearate, and dioleate, and other aromatic hydrocarbon carboxylates such as the ditoluate, dinaphthoate and diphthalate.

In like manner, the corresponding diesters of N-methyl-dihydro E-73 are prepared using the N-methyldihydro E-73 monoesters of Example V.

Example VII

The benzylidine derivative of dihydro E-73 is prepared by treating 0.5 g. of dihydro E-73 dissolved in 10 ml. of benzene with 1 ml. of benzaldehyde and 0.5 g. of a cationic ion exchange resin of the sulfonated polystyrene type, e.g., Dowex 50, on the acid cycle. The mixture is stirred at room temperature for one hour, the catalyst filtered, the filtrate concentrated, and the concentrate poured into 50 ml. of ether. The benzylidine derivative of dihydro E-73 which precipitates is collected, washed, and recrystallized from 10-15 ml. of methanol to provide the purified product, M.P. 187° C.

The benzylidene derivatives of N-methyl dihydro E-73, N-methyl desacetyl dihydro E-73 and desacetyl dihydro E-73 are similarly prepared from the respective starting material.

Example VIII

One-half gram of dihydro E-73 in 10 ml. of 10% sodium hydroxide is kept at room temperature for twenty-four hours. The solution is then concentrated in vacuo to remove small amounts of the ammonia remaining in the solution from the hydrolysis, and the degassed solution is then adjusted to pH 1 with hydrochloric acid. The mixture is frozen and dried from frozen state. The dry residue is dissolved in 25 ml. of dry acetone, the insolubles filtered, and the filtrate concentrated to 2-3 ml. and poured into 10 ml. of ether yielding a colorless crystalline solid, which is collected, washed and dried; M.P. 173-175° C.

*Analysis.*—Calcd. for $C_{15}H_{24}O_6$: C, 59.98; H, 8.95. Neutral equivalent, calcd. 158. Found: C, 60.10; H, 8.42. Neutral equivalent, 158.

This product appears to be a lactone of the substituted glutaric acid corresponding to the removal of the nitrogen and acetyl group from dihydro E-73.

Partial hydrolysis of desacetyl dihydro E-73, N-methyl dihydro E-73 and N-methyl desacetyl dihydro E-73 under similar conditions results in elimination of ammonia (of methylamine in the case of the N-methyl derivatives) and in the case of N-methyl dihydro E-73, of the acetyl group. The product obtained from each of these compounds is identical to that obtained from dihydro E-73.

*Example IX*

A solution of 1.5 g. of the lactone of Example VIII is prepared and treated with a solution of diazomethane prepared from 2 g. of nitrosomethylurea and 20 ml. of ether in the usual fashion. After standing for ten minutes, the solution was filtered and concentrated in vacuo. The methyl ester lactone, which was thus recovered was employed as the starting material for the ammonolysis of Example X.

*Example X*

The product of Example IX is treated with 30 ml. of methanol saturated with ammonia and allowed to stand at room temperature overnight. If desired, the methanolic reaction mixture from the diazomethane treatment of Example IX can be employed for the ammonolysis without isolation of the ester. After standing overnight, the methanol is distilled and the diamide recovered as a clean, white residue.

*Example XI*

N-METHYL DESACETYLDIHYDRO E-73

Repetition of the procedure of Example III with N-methyl dihydro E-73 produces N-methyl desacetyldihydro E-73 identical to the N-methyl product of Example IV.

*Example XII*

MONOESTER OF DESACETYLDIHYDRO E-73

One-half gram of desacetyldihydro E-73 is dissolved in 2 ml. of acetic anhydride and 1 ml. of pyridine and stored at room temperature for twenty-four hours. The reaction mixture is evaporated to dryness in a current of air and the residue recrystallized from a 1:5 mixture of methylene chloride and ether. The product is identical to dihydro E-73.

Substitution of the acetic anhydride by propionyl anhydride, maleic anhydride, phthaloyl anhydride and succinoyl anhydride produces the respective monoesters.

INn like manner, but substituting N-methyldesacetyldihydro E-73 for desacetyl dihydro E-73, the corresponding monoesters of N-methyl desacetylidihydro E-73 are produced.

The monobutyrate, monobenzoate, monopalmitate, mono-oleate, monostearate, mononaphthoate and monotoluate esters of desacetyldihydro E-73 and N-methyl desacetyldihydro E-73 are prepared by the reaction of desacetyldihydro E-73 and N-methyldesacetyldihydro E-73 with the appropriate acid chloride in pyridine according to well-known procedures.

*Example XIII*

The products of Example XII are aceylated further according to the procedure of Example XII using the acid chloride or anhydride corresponding to the ester group already present to give mixtures of the di- and tri-esters of desacetyl dihydro E-73 and N-methyl desacetyldihydro E-73.

*Example XIV*

The patient was a female cocker spaniel, 8 years old (Canrut 179). At entry the animal was slightly dehydrated with some mucopurulent discharge from the eyes, decreasing the body weight and appetite. All palpable lymph nodes were enlarged. The right superior lymph node measured 3 x 4 x 3 centimeters. The right inferior lymph node measured 4 x 3.6 x 2 centimeters. The nodes were firm or palpation. The white blood cell count was 23,950/cu. mm. (normal 10-12,000) the red blood cell count was 4,200,000/cu. mm. (normal 5-7 m.) the hemoglobin content was 13.0 gms. percent (normal 14-15). Body temperature was 103.4° F. (normal 101-101.5°). The body weight was 9.0 kilograms. The dose level decided upon was 0.5 mg. of dihydro E-73 per kilogram of body weight to be administered intravenously on three consecutive days with a four day interval between treatments.

The first series of treatments presented a problem of emesis which occurred two to three minutes after intravenous administration and was considered the effect of direct action on the vomiting center of the brain. Vomiting continued for five hours on the first day of administration. On the second day 10 mg. of "Trilafon" (Schering) was drawn into the syringe and administered with the dihydro E-73. Vomiting occurred only twice then, only once after the third injetcion, but food intake decreased markedly.

For the second series of injections the dose level was raised to 0.75 mg. per kilogram body weight in the same administrative pattern. At this time the right superior cervical lymph node measured 3.3 x 2.5 x 1.5 cm., the right inferior cervical lymph node measured 5.2 x 3.4 x 1 cm. The white blood cell count was now 34,400 cu. mm., the hemoglobin content 11.0 gms. percent. Body weight was still 9 kilograms. Body temperature, however, remained at 103° F. The appetite had now returned and the intake went up from a starting 450 to 900 grams a day. During the second series of injections vomiting was prevented by co-administration of 25 mg. of thorazine.

For the third series of injection the pretreatment white blood cell count was 59,350/cu. mm. The body temperature was 102.8° F. Appetite and food intake continued excellent. The nodes were now soft, could be moved freely in the surrounding tissue and it was decided to withhold therapy and obesrve the course of this change. Over a five day period the nodes now regressed until only those of the cervical group were palpable. Food intake remained unchanged during the regression period. At this time the right superior cervical lymph node measured 1.5 x 2 x ? cm. The right inferior cervical lymph node measured 2 x 1.8 x ? cm.

The white blood cell count on the fourth week had decreased to 28,900/cu. mm. and the body temperature to normal. Hemoglobin values remained at 11.0 to 11.5 gms. percent during this period.

No further treatment has been given this animal. She was observed for one additional month during which her white blood cell count levelled off slightly above normal at an average of 14,500/cu. mm.

This patient is now enjoying her sixth month in remission.

This case is of interest. In comparison with similar results attained using the alkylating agent N(3-oxapentamethylene)N'-N''-diethylenephosphoramide (MEPA) the regression of lymph nodes after two series of treatments was not considered a good prognostic sign, for in these cases the remission periods were seldom longer than three weeks.

With MEPA regression of the lymph nodes and spleen occurred within thirty-six hours and was accompanied by extremely severe symptoms occasioned by the resorption of lymphocytes and lymphoblasts, the differential count during regresison shooting to 94% agranulocytes. Body temperature rose to 104° F. or higher and severe anaphylactoid symptoms occurred controllable by massive doses of antihistamine. Food intake ceased, then began at full intake on reversal of the syndrome.

In this case treated with dihydro E-73 no symptoms of shock occurred. The patient's food intake remained excellent. This is perhaps attributable to the slower five day period of regression. The only severe side reactions to this agent were vomiting which was prevented by coadministration or tranquilizer and local proliferative phlebitis at the site of venipuncture.

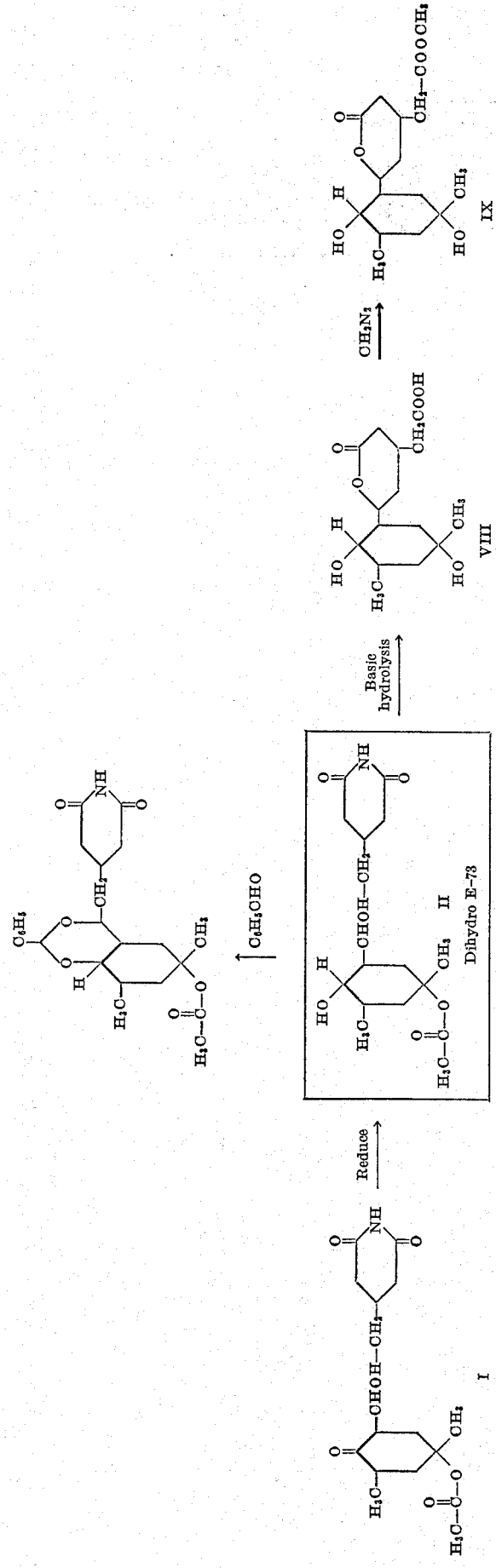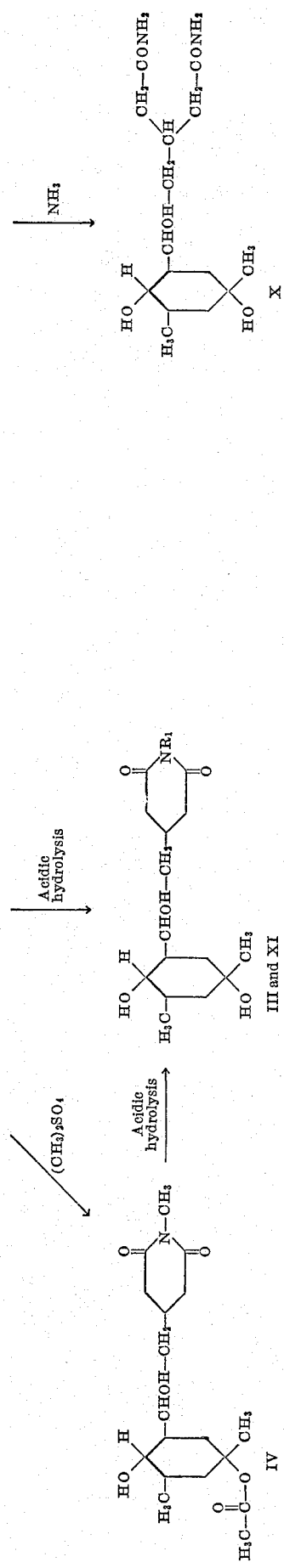

What is claimed is:

1. A compound selected from the group consisting of 3-[2-(5-acetoxy-2-hydroxy-3,5-dimethylcyclohexyl)-2-hydroxyethyl]-N-methyl-glutarimide, the monoesters and diesters thereof, the ester group being of the formula RCOO— wherein RCO is the acyl group of an acid selected from the group consisting of fatty acids having 2 to 18 carbon atoms, acrylic acid, undecylenic acid, oleic acid, succinic acid, maleic acid, hydroxypropionic acid, benzoic acid, toluic acid, naphthoic acid and phthalic acid; 3-[2-(2,5-dihydroxy-3,5-dimethylcyclohexyl)-2-hydroxyethyl]glutarimide, 3-[2-(2,5-dihydroxy-3,5-dimethylcyclohexyl)-2-hydroxyethyl]-N-methyl-glutarimide, the monoesters, the diesters and the triesters thereof, wherein the ester group has the same significance as above, and 3-[2-(5-acetoxy-2-hydroxy-3,5-dimethylcyclohexyl)-2-hydroxyethyl]-glutarimide.

2. 3-[2-(5-acetoxy-2-hydroxy-3,5-dimethylcyclohexyl)-2-hydroxyethyl]-glutarimide.

3. 3-[2-(5-acetoxy-2-hydroxy-3,5-dimethylcyclohexyl)-2-hydroxyethyl]-N-methyl-glutarimide.

4. 3-[2-(2,5-dihydroxy-3,5-dimethylcyclohexyl)-2-hydroxyethyl]-glutarimide.

5. 3-[2-(2,5-dihydroxy-3,5-dimethylcyclohexyl)-2-hydroxyethyl]-N-methyl-glutarimide.

No references cited.